United States Patent [19]

Ishikawa et al.

[11] Patent Number: 4,908,632

[45] Date of Patent: Mar. 13, 1990

[54] THERMAL PRINTING APPARATUS

[75] Inventors: Shigeo Ishikawa; Hiroshi Tokuda; Akira Ninomiya, all of Nagoya, Japan

[73] Assignee: Brother Kogyo Kabushiki Kaisha, Nagoya, Japan

[21] Appl. No.: 307,056

[22] Filed: Feb. 7, 1989

[30] Foreign Application Priority Data

Mar. 10, 1988 [JP] Japan .................................. 63-56899

[51] Int. Cl.[4] ........................... G01D 15/10; B41J 3/20

[52] U.S. Cl. ........................... 346/76 PH; 346/139 R; 400/120

[58] Field of Search .............. 346/76 PH, 139 R, 105; 400/120, 234, 236.2

[56] References Cited

U.S. PATENT DOCUMENTS 4,516,137 5/1985 Yasui .............................. 346/76 PH 4,598,301 7/1986 Suzaki ............................. 346/76 PH 4,609,299 9/1986 Hattori et al. ...................... 400/120

*Primary Examiner*—Bruce A. Reynolds

*Assistant Examiner*—Mark Reinhart

*Attorney, Agent, or Firm*—Oliff & Berridge

[57] ABSTRACT

A thermal printing apparatus includes a carriage body on which a thermal ribbon cassette is detachably mounted, a driving gear rotated in accordance with the movement of the carriage body, a spool shaft rotatably mounted on the carriage body for rotating a ribbon spool of a ribbon cassette, and a rotation transmitting mechanism adapted to interlink or interrupt between the driving gear and the spool shaft when a ribbon cassette is mounted on or removed from the carriage body, respectively. The thermal printing apparatus further includes a shaft operable to detect if a ribbon cassette is mounted, and the rotation transmitting mechanism includes an engaging member engageable with a disc portion secured to the shaft for holding the rotation transmitting mechanism in a state where the interlinking between the driving gear and the spool shaft is interrupted. By means of this structure, rotation of the spool shaft and gears connected therewith is stopped when printing on a sheet of heat-sensitive paper without thermal transferable ribbon, thus enabling the thermal printing apparatus to achieve higher speed printing with reduced load on a driving power source.

11 Claims, 5 Drawing Sheets

THERMAL PRINTING APPARATUS

FIELD OF THE INVENTION

The present invention relates to a thermal printing apparatus having a thermal print head movable along a platen, wherein printing on a sheet of non-heat-sensitive paper is effected by the thermal print head through a thermal transferable ribbon of a thermal ribbon cassette set at a required position, whereas printing on a sheet of heat-sensitive paper is achieved directly by the thermal print head without using the thermal transferable ribbon.

BACKGROUND OF THE INVENTION

In a conventional thermal printing apparatus of the above type, a ribbon feeding mechanism is provided for supplying a fixed amount of the thermal transferable ribbon at desired timing during printing on the non-heat-sensitive paper. The feeding mechanism continues its feeding motion even during printing on a sheet of heat-sensitive paper without the thermal transferable ribbon.

In such a thermal printing apparatus with the foregoing construction, however, it is unnecessary to continue the feeding motion of the feeding mechanism during printing on the heat-sensitive paper. Further, in a printing apparatus constructed so as to drive both a ribbon feeding mechanism and a carriage driving mechanism by a common drive source, an excessive load is imposed on the common drive source owing to the ribbon feeding motion when the carriage is driven during printing on heat-sensitive paper, thus rendering it difficult to achieve a high speed printing.

SUMMARY OF THE INVENTION

Accordingly, it is an object of the present invention to provide a thermal printing apparatus capable of performing the feeding motion of a ribbon feeding mechanism during printing with a thermal transferable ribbon, while stopping the feeding motion during printing on a sheet of heat-sensitive paper without the thermal transferable ribbon.

In order to accomplish the above-mentioned object, the thermal printing apparatus according to the present invention comprises: drive means actuated to move a carriage along a platen; a thermal print head supported on said carriage; a ribbon cassette detachably mounted on said carriage and including a ribbon spool around which a thermal transferable ribbon is wound; a rotatable spool shaft mounted on said carriage and engageable with said ribbon spool to rotate said ribbon spool; means for transmitting rotational force from said drive means to said spool shaft, said transmitting means being selectively changeable between a first state wherein said rotational force generated by actuation of said drive means is transmitted to said spool shaft, and a second state wherein transmission of said rotational force to said spool shaft is interrupted; means for detecting if a ribbon cassette is mounted on said carriage; and means for holding said transmitting means in said second state when mounting of a ribbon cassette is not detected.

According to the foregoing construction of the present invention, the holding means interrupts transmission of the rotational force from the drive means to the spool shaft when the mounting of a thermal transferable ribbon cassette is detected. Hence, the feeding motion of the ribbon feeding mechanism is stopped during printing on heat-sensitive paper, so that higher speed printing may be achieved by the thermal printing apparatus.

BRIEF DESCRIPTION OF THE DRAWINGS

The above and other objects, features and advantages of the present invention will become more apparent from reading the following description of the preferred embodiment taken in connection with the accompanying drawings in which.

DESCRIPTION OF THE PREFERRED EMBODIMENT

Referring to the accompanying drawings, a typical embodiment of a thermal printing apparatus according to the present invention will now be explained.

Figure 1:
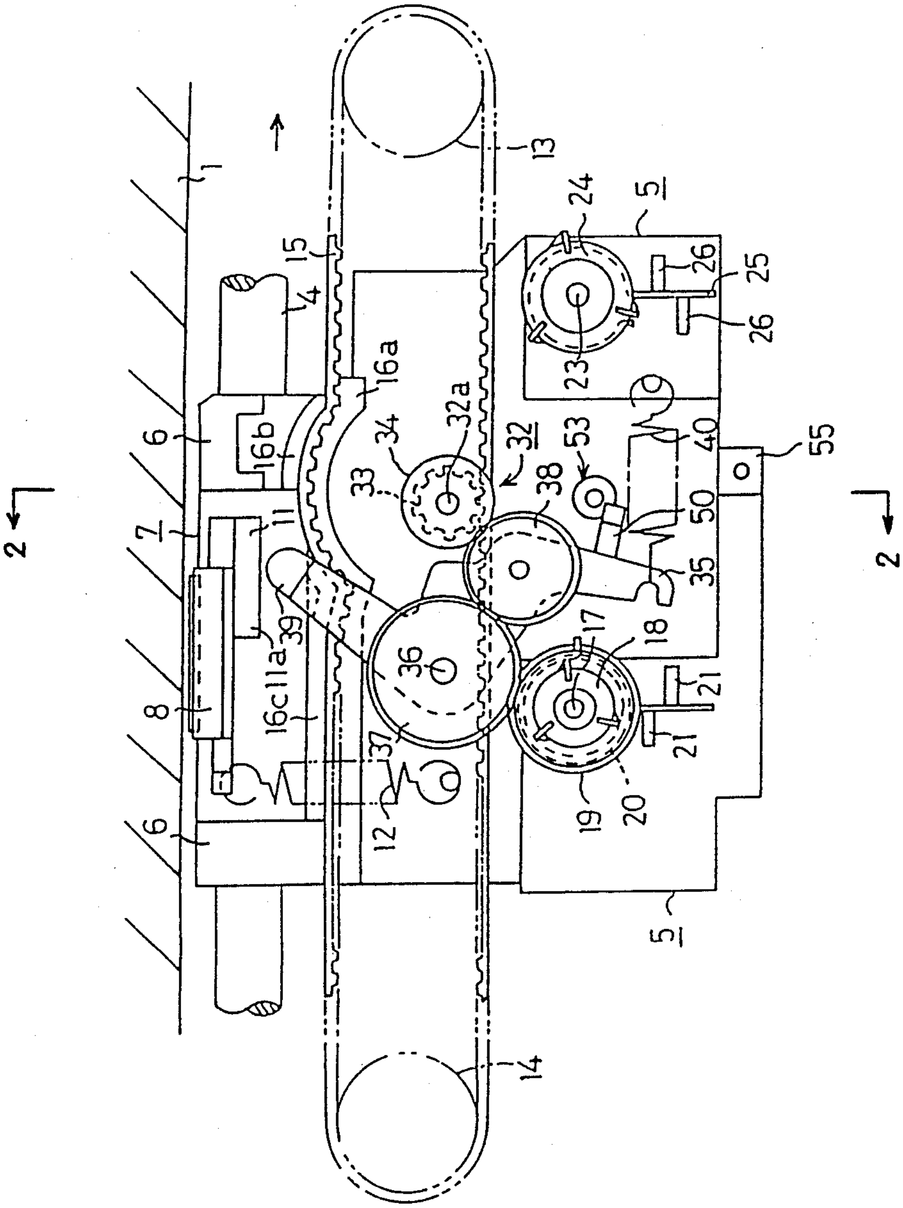
FIG. 1, is a plan view of an embodiment of a thermal printing apparatus according to the present invention.
Figure 2:
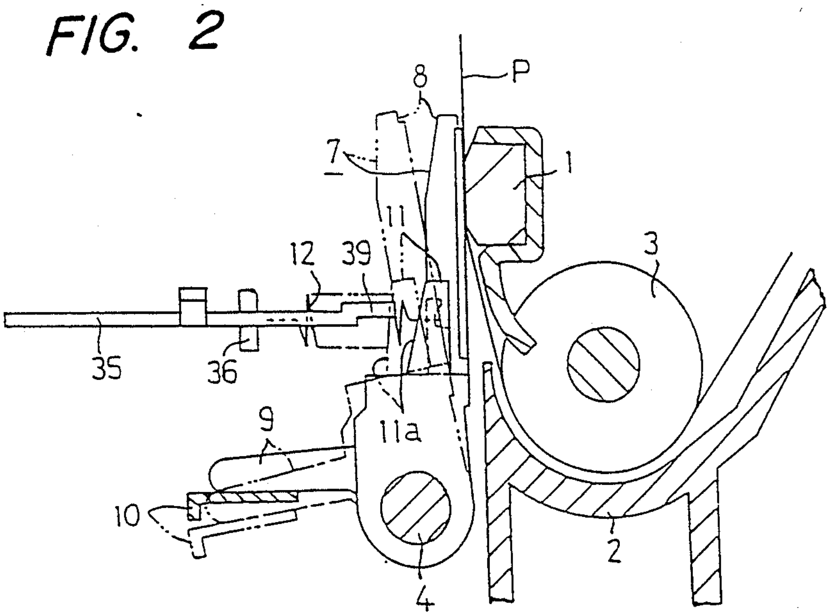
FIG. 2 is a crosssection along lines 2—2 of FIG. 1 showing a head carriage of the embodiment of FIG. 1.

As shown in FIGS. 1 and 2, a longitudinally extending platen 1 is provided on a frame (not shown) of the thermal printing apparatus, and a paper guide member 2 and a paper feeding roller 3 are disposed beneath the platen 1 in the frame. A carriage body 5 is movably supported, through journal members 6 provided at its opposite ends, by a supporting shaft 4 which extends parallel to and beneath the platen 1. A front bottom surface of the carriage body 5 is supported on a guide member (not shown).

A bottom portion of a head carriage 7 is rotatably supported by the shaft 4 between the journal members 6. A print head 8 is provided on an upper surface of the head carriage 7 in opposition to the platen 1. A projecting tab 11 having a slanted surface 11*a* inclined from a top portion of the head 8 toward a rear bottom portion thereof is provided at a bottom portion of the print head 8. As shown in FIG. 2, a tension spring 12 applies tension to the head carriage 7 and the print head 8 to rotate them counterclockwise.

A release lever 10 is disposed in the frame so as to oppose a bottom surface of a projection tab 9 which is provided at a rear side surface of the head carriage 7, and is adapted to change its position by means of a control device of the thermal printing apparatus. The projection tab 9 is urged in contact with the release lever 10 under the bias force applied to the head carriage 7 by the tension spring 12. When the release lever 10 is moved to a position shown by the solid line in FIG.

2, the print head 8 together with the head carriage 7 are held at a printing position as shown by the solid line in FIG. 2. On the other hand, when the release lever 10 is moved to a position shown by the chain line in FIG. 2, the print head 8 together with the head carriage 7 are disposed at a non-printing position as shown by the chain line in FIG. 2.

At the side portions of the frame, there are provided an idler pulley 14 and a driving pulley 13 which is rotated forwardly and reversely by a driving motor (not shown). An endless toothed driving belt 15 is wound around both of the pulleys 13 and 14. A part of the driving belt 15 is engaged with a toothed wall 16*a* which protrudes from an upper surface of the carriage body 5, thereby sandwiching a part of the belt 15 between the toothed wall 16*a* and plural holding walls 16*b* and 16*c* as shown in FIG. 1.

Figure 5:
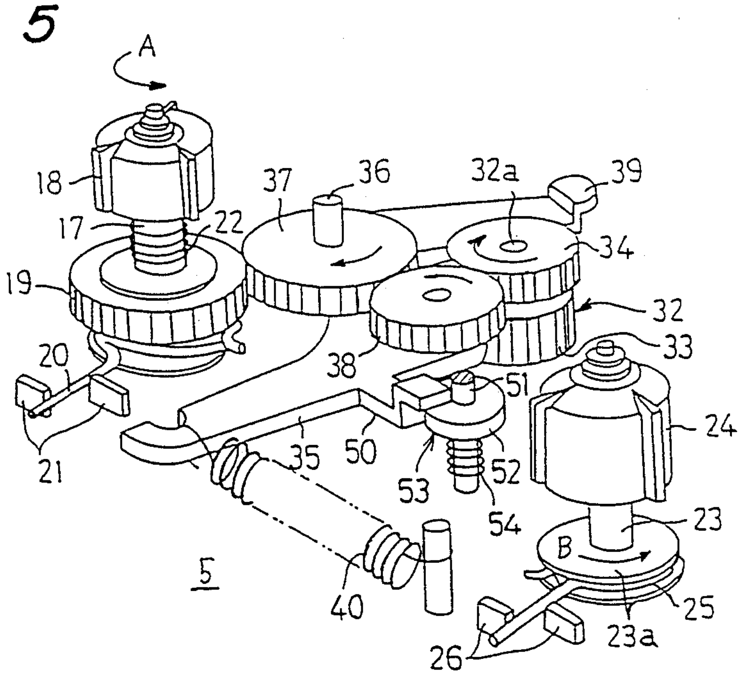
FIG. 5 is a perspective view showing spool shafts, a release lever and a retention member of the embodiment of FIG. 1.
Figure 3:
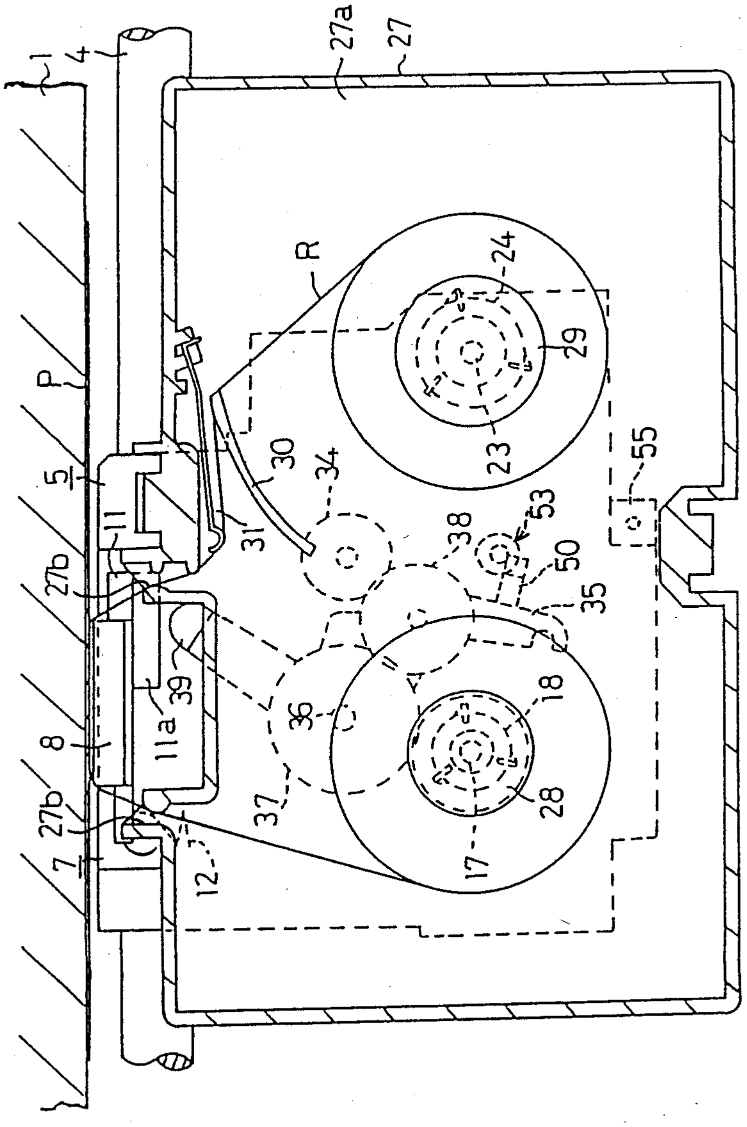
FIG. 3 depicts the inner components of a ribbon cassette mounted on a carriage body with the head carriage set in a printing position.
Figure 6:
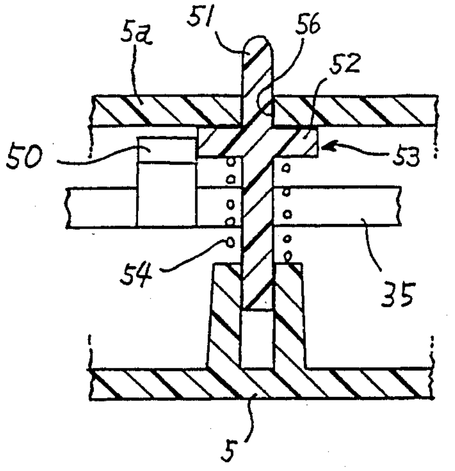
FIG. 6 is an enlarged cross-sectional view showing one of two positional situations between the retention member and an engaging member of the embodiment of FIG. 1 when a ribbon cassette is removed from the carriage body.

As shown in FIGS. 1, 3 and 5, a spool shaft 17 for winding a ribbon is rotatably mounted on the upper surface of the carriage body 5 in front of the driving belt 15. Further, on an upper side of the carriage body 5, a plate-shaped cassette holder 5*a* is disposed so as to substantially cover the body 5 as shown in FIG. 6. An interlinking cylindrical member 18 (FIG. 5) is fixed on a top end of the spool shaft 17, an upper portion of the cylindrical member 18 extending upwardly through an opening (not shown) in the cassette holder 5*a*. A driven gear 19 (FIG. 5) is rotatably supported by a bottom portion of the spool shaft 17.

A coil spring 22 is wound around the spool shaft 17 between the interlinking cylindrical member 18 and the driven gear 19. Further, a rotation transmitting disc (not shown) is fixedly mounted to the shaft 17 beneath the driven gear 19. The driven gear 19 is pressed into contact with the rotation transmitting disc by the coil spring 22 so that the gear 19 and the disc rotate together.

A spring 20 is wound around the bottom portion of the spool shaft 17 between the driven gear 19 and the upper surface of the carriage body 5 in a manner such that an outer end of the spring 20 is fixedly held by a pair of fixing tabs 21 provided on the carriage body 5. The spring 20 has the function of imposing a rotational resistance on the spool shaft 17 when a counter rotational force is imposed on the spool shaft 17 tending to unwind the ribbon. Consequently, the spool shaft 17 and the interlinking cylindrical member 18 are capable of rotating only in a direction to wind the ribbon, i.e., in the direction shown by arrow A in FIG. 5.

A spool shaft 23 for feeding the ribbon is rotatably provided on the carriage body 5 at the right side of the spool shaft 17 (as viewed in FIG. 1) for winding the ribbon. An interlinking cylindrical member 24 is fixed on a top end of the spool shaft 23. A spring 25, having an elastic force smaller than that of the spring 20, is wound around the spool shaft 23 at the bottom portion thereof between a pair of discs 23*a* which are rotated with the spool shaft 23. An outer end of the spring 25 is fixedly held by a pair of fixing tabs 26 provided on the carriage body 5. The spring 25 is wound around the spool shaft 23 in such a manner as to impose a rotational resistance on the spool shaft 23 when the spool shaft 23 is rotated to feed the ribbon, i.e., in the direction shown by arrow B in FIG. 5.

Figure 4:
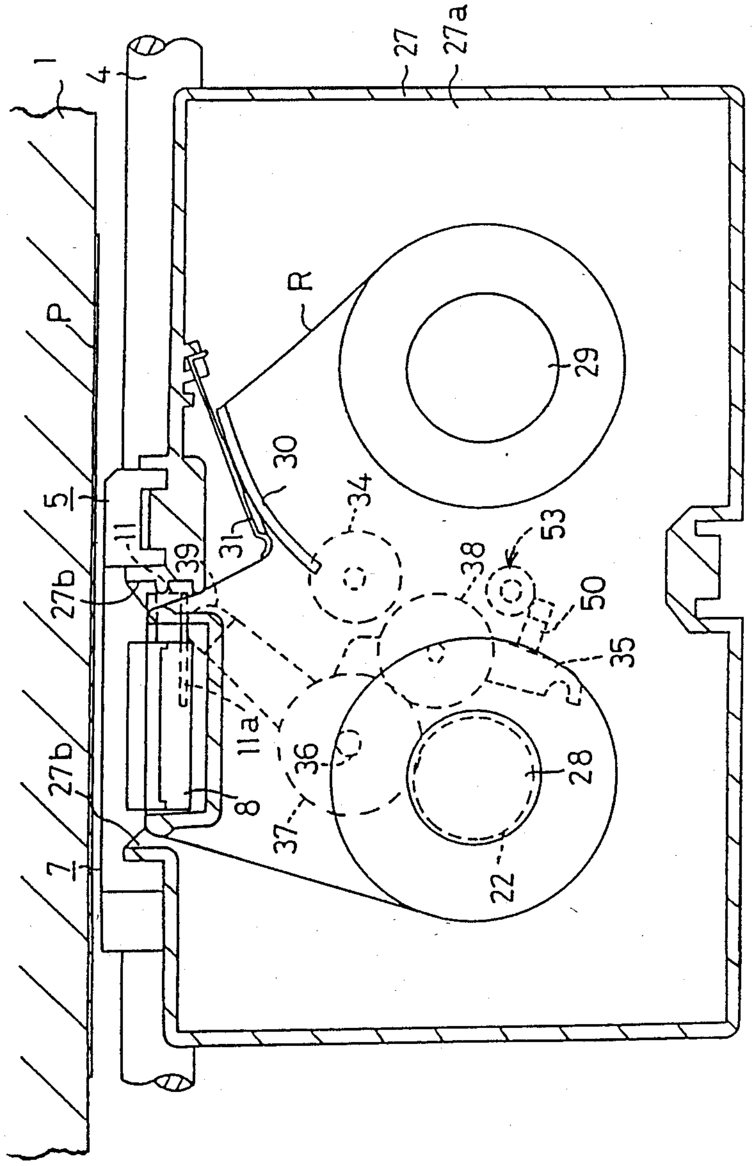
FIG. 4 depicts the inner components of a ribbon cassette mounted on the carriage body with the head carriage set in a non-printing position.

A ribbon cassette 27 (FIG. 4) is detachably mounted on the carriage body 5. On a bottom wall 27*a* of the cassette 27, a ribbon spool 28 for winding the ribbon and a ribbon spool 29 for feeding the ribbon are rotatably received, respectively. The ribbon spool 28 is fitted to the interlinking cylindrical member 18 mounted on the spool shaft 17, and the ribbon spool 29 is fitted to the interlinking cylindrical member 24 mounted on the spool shaft 23.

A pair of ribbon passing openings 27*b* are provided in a rear edge of the ribbon cassette 27 on opposite sides of the print head 8. A guide wall 30 having an arc-like configuration is formed so as to project from the bottom wall 27*a* of the ribbon cassette 27 between the passing opening 27*b* disposed on the right (as viewed in FIG. 4) and the ribbon spool 29. A leaf spring 31 is secured at a bottom portion thereof between the guide wall 30 and a rear inside wall of the ribbon cassette 27, thereby applying tension to the ribbon as it passes along the guide wall 30. In addition, the thermal transferable ribbon R wound around the ribbon spool 29 is passed into a space between the guide wall 30 and the spring 31, is fed to a position in front of the print head 8 through the right ribbon passing opening 27*b*, and is wound through the left ribbon passing opening 27*b* and around the ribbon spool 28.

A driving member 32 (FIGS. 1 and 5) is provided on the carriage body 5 between the spool shafts 17 and 23 and is rotatably mounted on a shaft 32*a*. A driving gear 33 is formed on a lower peripheral surface of the driving member 32 so as to engage with an inner surface of the driving belt 15. When the head carriage 7 is moved toward the right (forward direction) together with the carriage body 5 in accordance with the rotation of the driving belt 15, the driving gear 33 is rotated clockwise in FIG. 1 through the engagement with the driving belt 15. On the other hand, when the head carriage 7 is moved toward the left (reverse direction) together with the carriage body 5, the driving gear 33 is rotated counterclockwise in FIG. 1.

A first intermediate gear 34 is formed on an upper peripheral surface of the driving member 32. A release lever 35 is rotatably supported almost at a center portion thereof by a shaft 36 which protrudes from the carriage body 5 between the driving gear 33 and the driven gear 19. A second intermediate gear 37 is rotatably mounted on the shaft 36 above the release lever 35 so as to engage with the driven gear 19. Further, a third intermediate gear 38 is rotatably mounted on the release lever 35 so as to engage with the second intermediate gear 37 and to be selectively engageable with the first intermediate gear 34 in accordance with the rotational movement of the release lever 35.

An engaging member 39 is formed at a rear end of the release lever 35 and is capable of engaging with the slanted surface 11*a* of the projection tab 11 formed on the print head 8. A tension spring 40 applies tension to the release lever 35 so as to rotate it counterclockwise about the shaft 36 in FIG. 1.

An engaging member 50 protrudes from a right side portion of the release lever 35 as viewed in FIG. 5. At the right hand side of the engaging member 50, a retention member 53 is movably supported in a vertical direction by the carriage body 5. The retention member 53 is formed with a shaft 51 extending upwardly from the carriage body 5 and a disc portion 52 secured integrally to the shaft 51. A coil spring 54 is wound around the shaft 51 between the disc portion 52 and a bottom surface of the carriage body 5. By means of the foregoing construction, the retention member 53 holds the release lever 35 at a position shown in FIG. 4 when a peripheral surface of the disc portion 52 engages with a rear edge of the engaging member 50.

Figure 7:
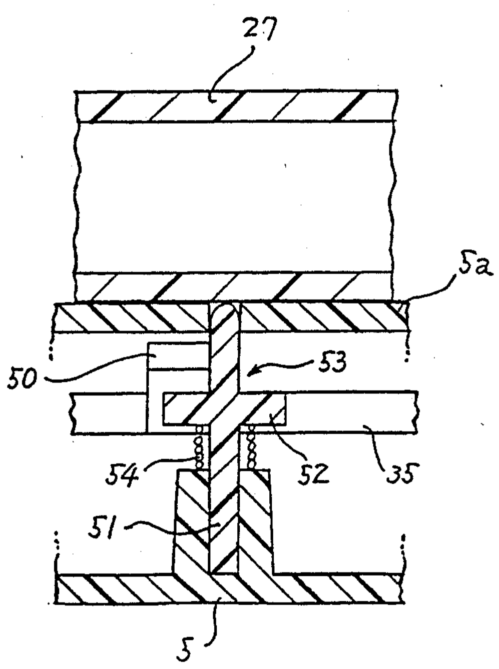
FIG. 7 is an enlarged cross-sectional view showing the other positional situation between the retention member and the engaging member of the embodiment of FIG. 1 when a ribbon cassette is mounted on the carriage body.

As shown in FIG. 6, a top portion of the shaft 51 protrudes through the opening 56 which is formed in the cassette holder 5*a* disposed on the upper side of the carriage body 5. When the ribbon cassette 27 is mounted on the cassette holder 5*a*, as shown in FIG. 7, the protruding part of the shaft 51 is pressed down against elastic force of the coil spring 54 through engagement with a bottom portion of the ribbon cassette 27, thereby detecting the mounting of the ribbon cassette 27 and releasing the disc portion 52 from engagement with the engaging member 50. In addition, a microswitch 55 (FIGS. 1 and 3) is disposed on a front side of the carriage body 5 and functions to also detect if the ribbon cassette 27 has been mounted on the cassette holder 5*a*. A control device (not shown) is provided to set a print mode of the thermal printing apparatus to either a unidirectional print mode or a bidirectional print mode in accordance with a detection signal from the microswitch 55.

The operation of the thermal printing apparatus constructed as described above will now be explained.

When mounting the ribbon cassette 27 on the carriage body 5, the release lever 10 is disposed at a position shown by the chain line in FIG. 2. Thus, the print head 8 on the head carriage 7 is held at the non-printing position shown by the chain line in FIG. 2 by the tension of the spring 12. In this state, the slanted surface 11*a* of the print head 8 is engaged with the engaging member 39 of the release lever 35, thereby displacing the release lever 35 to the position shown in FIG. 4 against the tension stress of the tension spring 40. As a result, the third intermediate gear 38 is displaced to a position disengaged from the first intermediate gear 34. At the same time, the engaging member 50 of the release lever 35 is engaged with the peripheral surface of the disc portion 52 of the retention member 53, and is held to a position shown in FIG. 4. In this state, the ribbon cassette 27 may be mounted on the carriage body 5, and the ribbon spool 28 for winding the ribbon and the ribbon spool 29 for feeding the ribbon may be fitted onto the spool shaft 17 for winding the ribbon and the spool shaft 23 for feeding the ribbon, respectively. Next, the part of the thermal transferable ribbon R exposed out of the ribbon cassette 27 through the ribbon passing openings 27*b* is disposed in front of the print head 8. In this manner, the mounting of the ribbon cassette 27 is completed.

Upon mounting of the ribbon cassette 27, the top end of the shaft 51 of the retention member 53 is engaged with the bottom portion of the ribbon cassette 27 and is pressed down against the elastic force of the coil spring 54. Thus, the engaging member 50 is released from the disc portion 52. Further, the microswitch 55 detects the mounting of the ribbon cassette 27, and transmits a signal to the control device (not shown) which sets the print mode to the unidirectional print mode.

When a given character key is pushed down, the release lever 10 is automatically shifted upward to a position shown by the solid line in FIG. 2 by an operation of the control device (not shown). Accordingly, the head carriage 7, as well as the print head 8, are displaced to the printing position shown by the solid line in FIG. 2 against the tension stress of the tension spring 12. The print head 8 is held at the printing position by the engagement of the projection tab 9 and the release lever 10. This displacement of the print head 8 enables the release lever 35 to be rotated counterclockwise.

The release lever 35 is rotationally shifted to the position shown in FIG. 3 by the force of the tension spring 40, so that the third intermediate gear 38 on the release lever 35 is engaged with the first intermediate gear 34. The driving gear 33 is operatively interlinked with the driven gear 19 through the first intermediate gear 34, the third intermediate gear 38 and the second intermediate gear 37. Further, by the rotational movement of the print head 8, the thermal transferable ribbon R is slightly pulled out of the ribbon feeding spool 29 against the stress applied thereto from the spring 25 shown in FIG. 5 and the leaf spring 31 shown in FIG. 3. This causes a part of the exposed ribbon R to be pressed onto normal printing paper P disposed on the platen 1.

In this state, if the print head 8 is operated by the control device, characters are printed on the printing paper P. If the driving pulley 13 is rotated by a predetermined angle clockwise in FIG. 1, the carriage body 5, head carriage 7 and print head 8 are also moved toward the right in FIG. 1, i.e., in a forward direction. Thus, the driving gear 33 is rotated by a given angle clockwise in FIG. 1 through the engagement with the driving belt 15.

With the rotation of the driving gear 33, the driven gear 19 is rotated by a given angle counterclockwise in FIG. 3, i.e., in the direction for winding ribbon, through the first, the second and the third intermediate gears 34, 37 and 38, so that the spool shaft 17, the interlinking cylindrical member 18 and the ribbon winding spool 28 are rotated together with the driven gear 19. Hence, the used portion of the thermal transferable ribbon R is wound up by the ribbon winding spool 28 against the stress of the spring 25 and the leaf spring 31, so that unused thermal transferable ribbon R is fed out of the ribbon feeding spool 29 for printing the next character on the printing paper.

If a carriage return key is pushed after completing printing of one line, the release lever 10 is automatically moved by the control device to a position shown by the chain line in FIG. 2. The head carriage 7 is displaced together with the print head 8 to the non-printing position shown in FIG. 2 by the force of the tension spring 12. At this time, the thermal transferable ribbon R is loosened to cause slack therein, so that the leaf spring 31 is bent toward the guide wall 30 by the counteracting force thereof and is displaced to the position shown in FIG. 4, thereby eliminating slack in the ribbon R. In this embodiment, the biasing stress of the spring 20 is set to be larger than that of the spring 25, so that the ribbon R having once wound around the ribbon winding spool 28 cannot be unwound but the ribbon R can always be fed out of the ribbon feeding spool 29. Further, by the displacement of the print head 8 to a position shown by the chain line in FIG. 2, the slanted surface 11*a* of the print head 8 is engaged with the engaging member 39 of the release lever 35, thereby rotating the release lever 35 clockwise in FIG. 3 to separate the third intermediate gear 38 from the first intermediate gear 34. Thus, the driven gear 19 is disengaged from the driving gear 33.

In this state, if the driving pulley 13 is rotated counterclockwise in FIG. 1, the carriage body 5 is moved toward the left in FIG. 1, i.e., in the reverse direction, and is returned to a predetermined print start position at the left side of the printer frame. At this time, the driving gear 33 is rotated counterclockwise in FIG. 1 through the engagement with the driving belt 15. As described above, however, the rotational operation of the driving gear 33 is not transmitted to the driven gear 19, so that the ribbon winding spool 28 is not rotated to unwind the ribbon during a carriage return.

Next, explanation will be provided for character printing on thermally sensitive printing paper P in a bidirectional printing manner.

In order to perform this operation, in a state where the print head 8 is disposed at a non-printing position shown by the chain line in FIG. 2, the ribbon cassette 27 is removed from the cassette holder 5a on the carriage body 5. Consequently, the retention member 53 is pushed up by the force of the coil spring 54, so that the disc portion 52 is again engaged with the engaging member 50. Further, the microswitch 55 does not detect the mounting of the ribbon cassette 27 on the carriage body 5, and does not transmit a signal to the control device (not shown); consequently, the control device switches the print mode to the bidirectional print mode.

Thereafter, the print head 8 is disposed to the position shown by the solid line in FIG. 2. At this time, the release lever 35 maintains the position shown in FIG. 4, with the third intermediate gear 38 disengaged from the first intermediate gear 34. In this state, characters may be printed on the thermally sensitive printing paper P when the print head 8 is operated with the carriage body 5 moved to the right or to the left, without any driving of the driven gear 19 or the intermediate gears 37 or 38.

It should be understood that the present invention is not limited to the description above, but is subject to modifications, alterations and equivalent arrangements within the scope of the appended claims.

What is claimed is:

1. A thermal printing apparatus comprising:
- drive means actuated to move a carriage along a platen;
- a thermal print head supported on said carriage;
- a ribbon cassette detachably mounted on said carriage and including a ribbon spool around which a thermal transferable ribbon is wound;
- a rotatable spool shaft mounted on said carriage and engageable with said ribbon spool to rotate said ribbon spool;
- means for transmitting rotational force from said drive means to said spool shaft, said transmitting means being selectively changeable between a first state wherein said rotational force generated by actuation of said drive means is transmitted to said spool shaft, and a second state wherein transmission of said rotational force to said spool shaft is interrupted;
- means for detecting if a ribbon cassette is mounted on said carriage; and
- means for holding said transmitting means in said second state when mounting of a ribbon cassette is not detected.

2. A thermal printing apparatus according to claim 1, wherein said thermal print head is shiftable between a printing position and a non-printing position, and said transmitting means is operative in association with said thermal print head so as to be set at said first state when said thermal print head is placed at said printing position and at said second state when said thermal print head is placed at said non-printing position.

3. A thermal printing apparatus according to claim 1, wherein said transmitting means includes a driving element connected to said drive means, a driven element connected to said spool shaft and a linking mechanism shiftable between a first position for interlinking said driving and driven elements and a second position for interrupting interlinking of said driving and driven elements.

4. A thermal printing apparatus according to claim 1, wherein said detecting means is elastically urged toward a predetermined position, and is displaced a given distance from said predetermined position when said ribbon cassette is mounted on said carriage.

5. A thermal printing apparatus according to claim 4, wherein said holding means is operatively connected to said detecting means, and is shifted to a predetermined holding position so as to engage with a part of said transmitting means and thereby hold said transmitting means in said second state when a ribbon cassette is not mounted on said carriage.

6. A thermal printing apparatus according to claim 1, further including means for switching between a unidirectional print mode and a bidirectional print mode according to whether or not a ribbon cassette is mounted on said carriage.

7. A thermal printing apparatus comprising:
- drive means actuated to move a carriage along a platen;
- a thermal print head supported on said carriage so as to be selectively placeable at either of a printing position and a non-printing position;
- a ribbon cassette detachably mounted on said carriage and including a ribbon spool around which a thermal transferable ribbon is wound;
- a rotatable spool shaft mounted on said carriage and engageable with said ribbon spool to rotate said ribbon spool;
- means for transmitting rotational force from said drive means to said spool shaft, said transmitting means having a first position wherein rotational force generated by actuation of said drive means is transmitted to said spool shaft, and a second position wherein transmission of said rotational force to said spool shaft is interrupted, said transmitting means being set at said first position when said thermal print head is placed at said printing position and at said second position when said thermal print head is placed at said non-printing position;
- means for detecting if a ribbon cassette is mounted on said carriage; and
- means, engageable with said transmitting means set at said second position, for holding said transmitting means at said second position when mounting of a ribbon cassette is not detected, regardless of shifting of said thermal print head to said printing position.

8. A thermal printing apparatus comprising:
- drive means actuated to move a carriage along a platen;
- a thermal print head supported on said carriage so as to be selectively placeable at either of a printing position and a non-printing position;
- a ribbon cassette detachably mounted on said carriage and including a ribbon spool around which a thermal transferable ribbon is wound;
- a rotatable spool shaft mounted on said carriage and engageable with said ribbon spool to rotate said ribbon spool;
- means for transmitting rotational force from said drive means to said spool shaft, said transmitting means having a first position wherein rotational force generated by actuation of said drive means is transmitted to said spool shaft, and a second position wherein transmission of said rotational force to said spool shaft is interrupted, said transmitting means being set at said first position when said thermal print head is placed at said printing position and at said second position when said thermal print head is placed at said non-printing position;

means for detecting if a ribbon cassette is mounted on said carriage, said detecting means having a contact portion engageable with a ribbon cassette and elastically urged toward a predetermined position to protrude from said carriage when a ribbon cassette is not mounted on said carriage, said contact portion being retracted a given distance from said predetermined position when engaging with a ribbon cassette mounted on said carriage; and means for holding said transmitting means at said second position when mounting of a ribbon cassette is not detected, said holding means being operatively connected to said contact portion of said detecting means and having a holding position predetermined to engage with said transmitting means set at said second position, said holding means being displaced to said holding position when said contact portion protrudes to said predetermined position;

whereby said transmitting means can be held at said second position regardless of shifting of said thermal print head to said printing position when a ribbon cassette is not mounted on said carriage.

9. A thermal printing apparatus according to claim 8, wherein said holding means includes a disc portion integrally secured to said contact portion, and a peripheral surface of said disc portion is engageable with said transmitting means.

10. A thermal printing apparatus according to claim 9, wherein said contact portion and said disc portion are urged toward said predetermined position by a spring disposed between said disc portion and said carriage.

11. A thermal printing apparatus comprising:

means for driving a carriage along a platen;

a thermal print head supported on said carriage and shiftable between a printing position and a non-printing position;

a ribbon cassette detachably mounted on said carriage and including a ribbon spool around which a thermal transferable ribbon is wound;

a rotatable spool shaft mounted on said carriage and engageable with said ribbon spool to rotate said ribbon spool;

a driving element rotatably mounted on said carriage and connected to said driving means;

a driven element connected to said spool shaft;

a release lever pivotally supported on said carriage, said release lever being set at a first position when said thermal print head is placed at said printing position and at a second position when said thermal print head is placed at said non-printing position;

at least one intermediate element rotatably mounted on said release lever, said intermediate element interlinking said driving and driven elements when said release lever is set at said first position and interrupting interlinking of said driving and driven elements when said release lever is set at said second position;

a shaft supported by said carriage so as to be movable in a direction substantially perpendicular to a plane within which said release lever pivotally moves, said shaft being elastically urged toward a predetermined position so as to protrude from said carriage and being displaced a given distance from said predetermined position by engagement with a ribbon cassette when the ribbon cassette is mounted on said carriage; and a disc secured to said shaft and having a peripheral surface engageable with said release lever, said disc holding said release lever at said second position by engagement of said peripheral surface with said release lever when a ribbon cassette is not mounted on said carriage.

* * * * *